July 22, 1952     F. C. BEEKLEY     2,604,008
SLIDE CHANGING DEVICE
Filed April 27, 1951     3 Sheets-Sheet 1
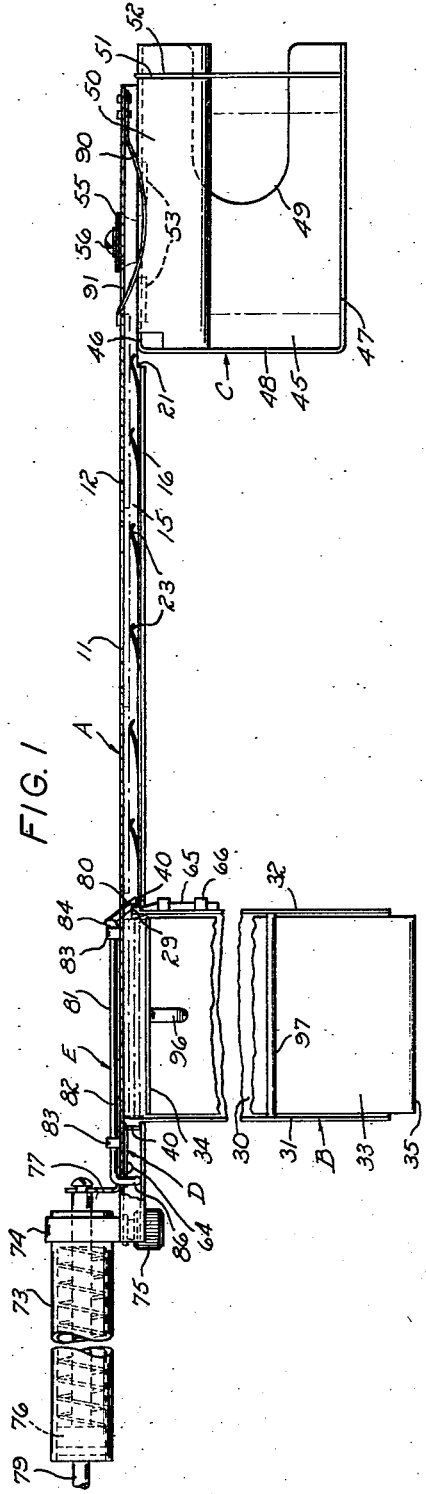
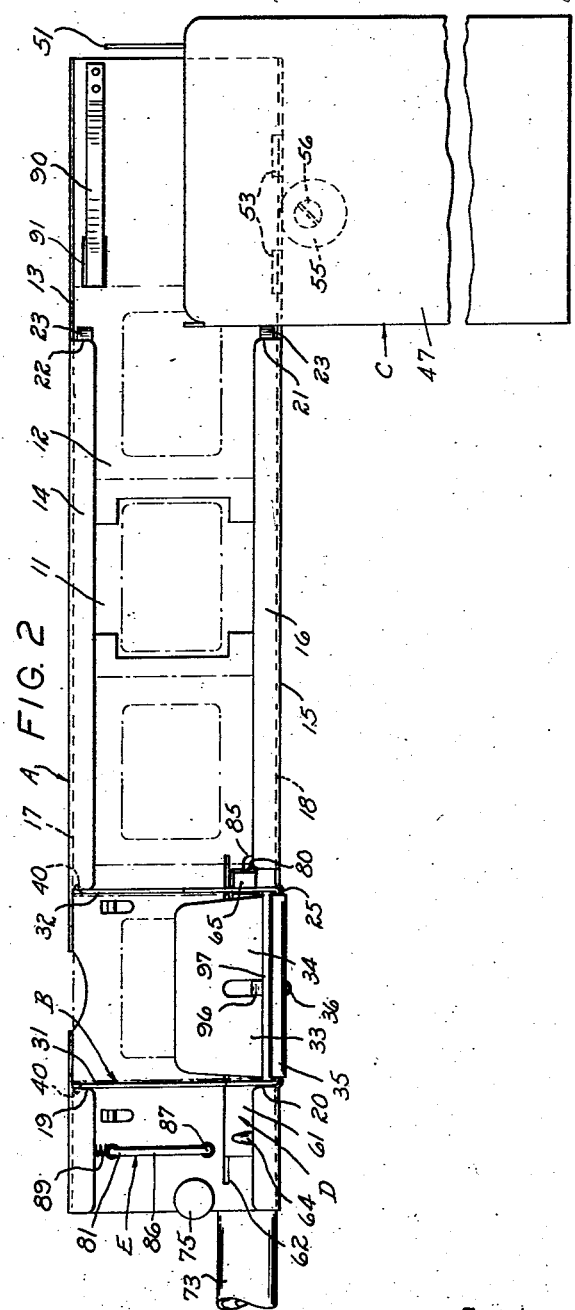
Inventor
FRANCIS CHEYNEY BEEKLEY
By
Lindsey and Prutzman
Attorneys July 22, 1952
F. C. BEEKLEY
2,604,008
SLIDE CHANGING DEVICE
Filed April 27, 1951
3 Sheets-Sheet 2
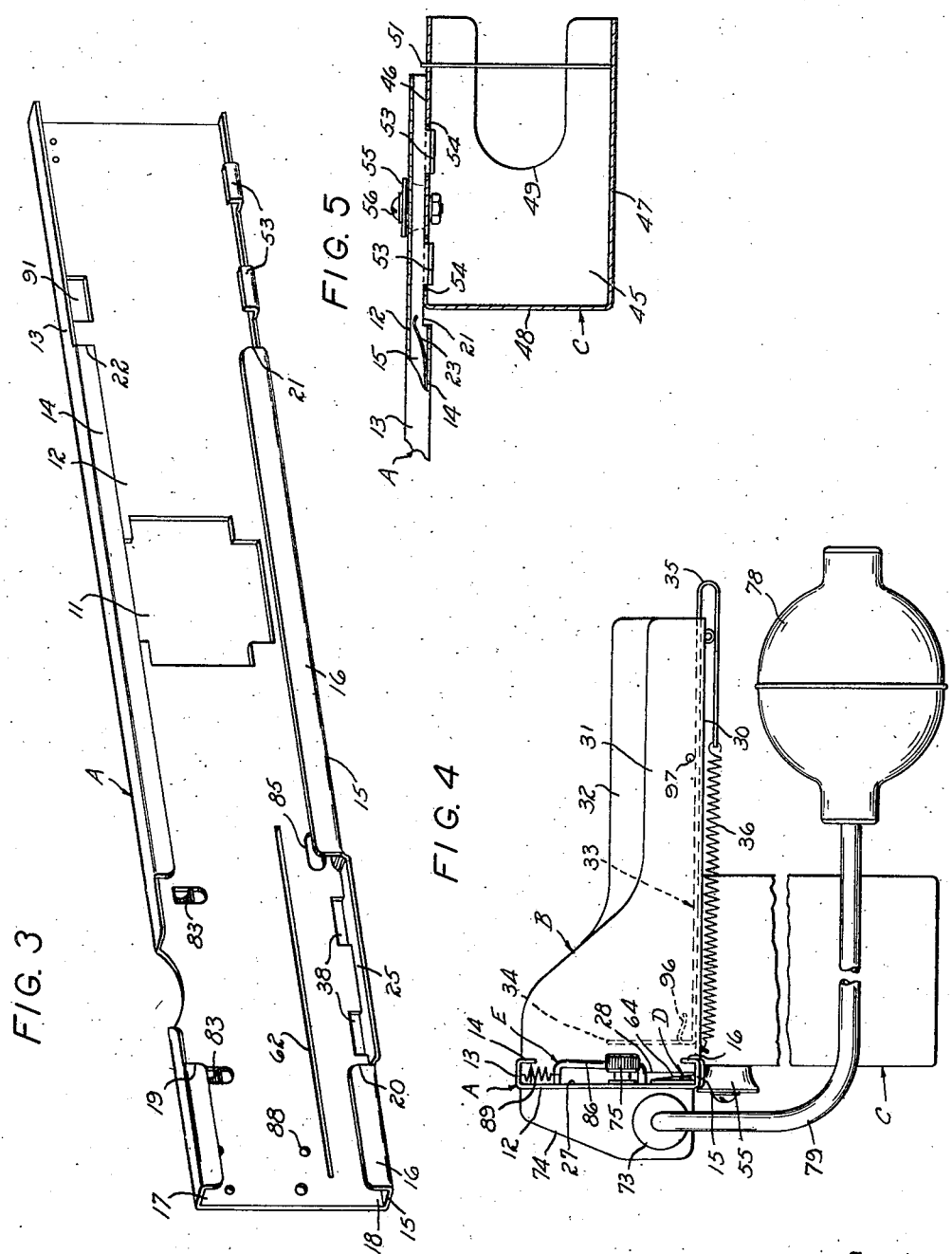
Inventor
FRANCIS CHEYNEY BEEKLEY
By
Lindsey and Prutzman
Attorneys July 22, 1952  F. C. BEEKLEY  2,604,008
SLIDE CHANGING DEVICE
Filed April 27, 1951  3 Sheets-Sheet 3
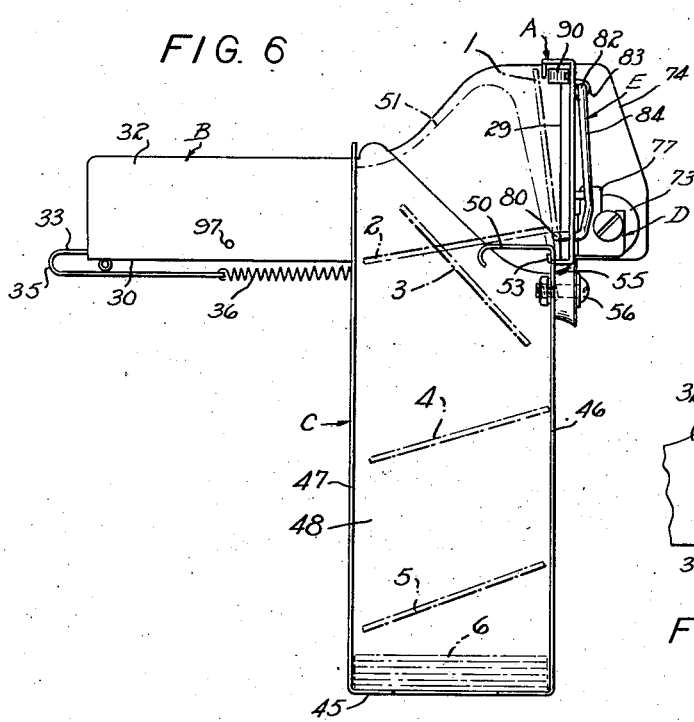
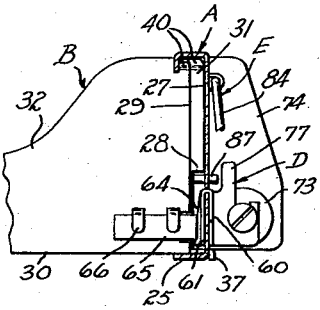
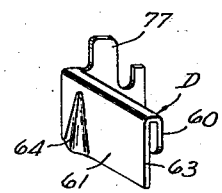
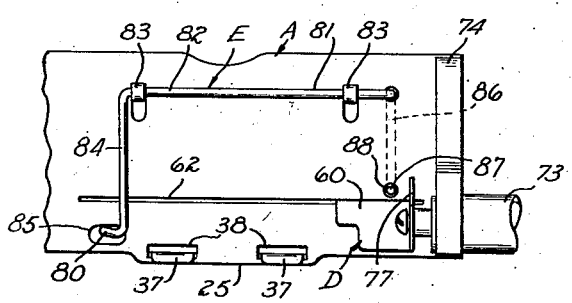
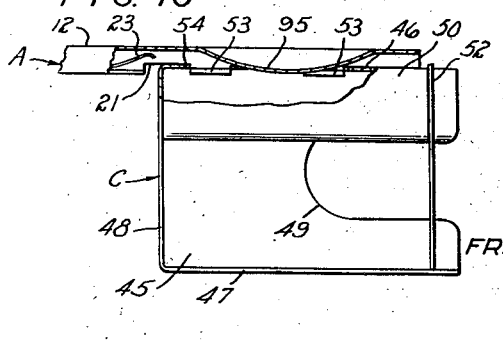
Inventor
FRANCIS CHEYNEY BEEKLEY
By Lindsey and Prutzman
Attorneys Patented July 22, 1952

2,604,008

UNITED STATES PATENT OFFICE 2,604,008

SLIDE CHANGING DEVICE

Francis Cheyney Beekley, West Hartford, Conn.

Application April 27, 1951, Serial No. 223,260

5 Claims. (Cl. 88—28)

This invention relates to slide projectors and more specifically to a slide changing device by which transparencies or slides are to be moved into and out of projecting position.

One object of the present invention is to provide a slide changing device which will move one slide at a time out of the supply magazine toward a projecting position and which may be operated to feed a plurality of slides in single order into projecting position and thereafter eject and collect the slides in the same order and arrangement as existed in the supply magazine.

It is another object of this invention to provide a slide changing device which is characterized by a simplified construction and compact arrangement of parts and which may be actuated by a single manipulation to move one slide out of the supply magazine, move a second slide into register for projection, and simultaneously eject a third previously projected slide.

A further object of the invention is to provide a slide changer which may be readily assembled for operation with a projector and which may be easily disassembled into separate units for storage.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a top plan view with parts in cross section of a slide changing device constructed in accordance with the present invention;

Fig. 2 is a front elevational view of the slide changer shown in Fig. 1;

Fig. 3 is a perspective view of the elongated channel guide which accommodates movement of the slides into and out of projection position;

Fig. 4 is a left hand end view of the slide changing device shown in Fig. 1;

Fig. 5 is a horizontal cross-sectional view of the righthand end portion of the slide changing device;

Fig. 6 is a righthand end view of the slide changer;

Fig. 7 is a rear elevational view of the lefthand portion of the slide changer shown in Fig. 1;

Fig. 8 is a side view of the delivery end of the supply magazine and a vertical cross-sectional view of that portion of the guide to which it is attached;

Fig. 9 is a perspective view of the feeder element; and

Fig. 10 is a view similar to Fig. 5 but showing a modified slide ejector.

In accordance with the present invention, the slide changer comprises generally an elongated guide A along which the transparency slides are successively moved in edge-to-edge relation past a projection opening 11; a slide magazine B detachably supported by the guide and extending forwardly therefrom; a receiver C detachably supported by and extending forwardly from the other end of the guide; a feeder D slidably carried by the guide for forwarding the slides in succession from the magazine and along the guide into registry with the projection opening 11 and then to the receiver C; and a device E for insuring that the foremost slide in the magazine is advanced laterally beyond the magazine before another slide can be advanced so as to prevent the slides from being advanced in overlapped relation.

The slide changer is mounted with respect to the projector between the source of light and the lens and with the projection opening therebetween in any suitable manner, either directly on the projector or by means of a separate support. Obviously, the magazine and receiver may extend either rearwardly of the guide or forwardly thereof. However, for convenience in disclosure, the word "forwardly" has been used and will hereinafter be used as indicating the direction in which the slides are moved in the magazine towards the guide.

Referring more specifically to the drawings and particularly to the guide, the same comprises a horizontally extending generally vertically disposed strip having its upper and lower edges turned rearwardly and then vertically so that the strip has a front wall 12, a horizontal web 13 and a depending flange 14 at the top; a horizontal web 15 and an upstanding flange 16 at the bottom. There is thus provided at the top and bottom edges grooves or trackways 17 and 18, respectively, which accommodate the upper and lower edges of the slides as they are moved therealong. To the lefthand side of the projection opening the flanges 14 and 16 are cut away as at 19 and 20 so as to accommodate the forward end of the magazine B. The lower web 15 is offset or depressed downwardly slightly so as to form a seat 25 for the bottom of the magazine.

At the right end of the guide, the lower flange 16 is cut away as at 21 so as to accommodate the upper portion of the front wall of the receiver C and the upper flange 14 is cut away as at 22 so as to permit the slides, as they move into registering position with the receiver, to pivot rearwardly about their lower edges whereupon they will fall into the receiver as hereinafter described more in detail. Suitably secured to the inner faces of the flanges 14 and 16 between the magazine and the receiver are leaf springs 23 which urge the slides against the front web or wall 12 of the guide.

Referring now to the magazine, the same comprises a trough-like member adapted to receive a plurality of transparencies arranged one behind the other and with the rear faces of the slides directed towards the guide. In the present illustrative disclosure, the magazine is formed of sheet metal and has a bottom 30 and side walls 31 and 32. The slides in the magazine are urged towards the guide by a follower 33 slidably engaging the bottom 30 and having an upright flange 34 on its forward end adapted to engage against the rearmost slide in the magazine. The other end 35 of the follower is bent back upon itself so as to project beneath the under side of the magazine bottom 30. A coil spring 36 having its opposite ends respectively connected to the magazine body and the follower end 35 urges the follower in a direction to advance the slides towards the guide.

In order to detachably mount the magazine on the guide, the bottom of the magazine is provided at its forward end with two downwardly bent lugs 37 which are adapted to hook into slots 38 in the front wall of the guide immediately above the seat 25 with the forward end of the magazine bottom resting upon the seat. The forward upper corners of the side walls 31 and 32 of the magazine have laterally outwardly extending ears 40 which are adapted to engage behind the edges of the top flange 14 at opposite sides of the cut-away portion 19 thereof. To mount the magazine on the guide, the lugs 37 are inserted into the slots 38 and then the magazine is swung upwardly so as to engage the ears 40 behind the top flange 14. This operation is facilitated by pressing the side walls 31 and 32 towards each other as the magazine is swung into position. When the magazine is in position, the forward edge 27 of the lefthand wall 31 is adapted to engage the rear face of the vertical wall 12 of the guide. This edge is notched or cut away as at 28 so as to accommodate movement of the feeder D. The front edge 29 of the other side wall 32 terminates short of the vertical wall 12 of the guide so as to provide a gap therebetween through which the foremost slide is fed from the magazine towards the projection opening 11.

Referring now to the receiver C, the same comprises a box-like structure, open at the righthand side so as to permit removal of the stacked transparencies received therein. The receiver has a bottom wall 45, a forward wall 46, a rear wall 47 and an end wall 48. The bottom wall has an elongated notch 49 so as to facilitate gripping between the fingers the stack of transparencies. The front wall 46 is turned rearwardly so as to provide a generally horizontal ledge 50 over which the slides tumble from the guide into the receiver, as hereinafter described more in detail. For the purpose of preventing the slides from tumbling out the open side of the receiver, a removable plate 51, preferably of transparent material, is provided. This plate is removably held in place by engaging it in a slot 52 extending across the shelf or ledge 50 and downwardly a suitable distance in the front wall 46 of the receiver.

In order to removably mount the receiver on the righthand end of the guide, the latter has a pair of rearwardly extending upturned lugs 53 and the receiver front wall 46 has spaced below the shelf 50 slots 54 adapted to receive the lugs 53. The receiver is mounted in place by hooking the lugs into the slots and then permitting the receiver to swing down to a substantially vertical position. Extending forwardly from the front wall of the receiver adjacent its upper edge is an abutment 55 adapted, when the receiver is in place, to engage the bottom edge of the guide. This abutment is preferably adjustable in order to adjust the vertical position of the receiver to insure that the slides will properly tumble into the receiver in correct position as hereinafter described in more detail. In the present instance this abutment is in the form of an eccentric secured in place by a screw 56. It may be stated here that, when the receiver is in place, the upper end of the front wall 46 of the receiver extends above the bottom web 15 of the guide so that when a transparency reaches its delivery position, the lower end thereof cannot move rearwardly but, on the other hand, is maintained in the groove between the vertical wall of the guide and the upper end of the receiver until the upper edge of the transparency has pivoted rearwardly and downwardly to the position indicated by the numeral 2 in Fig. 6. The receiver is of such depth as to permit a relatively large number of slides to tumble therein successively through 270°.

Referring now to the feeder D, shown in detail in Fig. 9, the same is formed of sheet material folded upon itself to provide a U-shaped member, the front and rear sections 60 and 61 of which straddle the front wall 12 of the guide. The connecting web of the feeder is mounted in a longitudinally extending slot 62 in the front wall of the guide. The righthand or forward edge 63 of the rear section 61 thrusts against the edge of the foremost slide in the magazine as the feeder is moved in a feeding direction, that is, to the right. A rearwardly facing projection or cam 64 is provided on the rear section 61 to the left of its front edge 63. This projection serves to engage the second slide in the magazine and push it rearwardly against the follower as the foremost slide is being moved by the feeder from the magazine. This assists in preventing the first two slides from snagging or jamming as the first slide is moved from the magazine. In addition, a rubber wiper 65 is secured by ears 66 so as to extend slightly beyond the forward edge of the right hand wall 32 of the magazine. This wiper tends to sweep a second slide back into the magazine in the event that it should tend to move or be dragged out of the magazine by the foremost slide.

The feeder or pusher D may be reciprocated by any suitable means, but for purposes of illustration, a pneumatic pump is illustrated. The pump has a cylinder 73 secured to the guide by means of a bracket 74 removably clamped in place by a screw 75. The pump has a spring-returned piston 76, the right hand end of which is secured to a flange 77 projecting from the front feeder section 60. When the operator compresses a bulb 78 attached by a tube 79 to the cylinder 73, the piston is moved on its operative stroke to carry the pusher forwardly from the retracted position shown in Figs. 1 and 2 to a position where its forward edge 63 is slightly to the right of a hereinafter described stop actuating finger 80. When the bulb is released, the spring within the cylinder returns the piston and feeder to the retracted position.

In the event that the operator should press the bulb only to such an extent that the foremost slide is not advanced in the guide beyond the magazine and, upon return of the feeder to its fully retracted position, the bulb were again compressed, the feeder would pick up the second transparency while the latter overlapped the trailing edge of the foremost transparency and a jamming would thereupon likely result in spite of the wiper 65. To prevent this, means is provided for preventing the feeder from moving to a retracted position where it can pick up the second transparency while the first transparency is still in a position where it has not been moved completely out of the magazine. This means comprises a wire element 81 having a central portion 82 journaled in bent ears 83 struck forwardly from the vertical wall of the guide. Extending from opposite ends of this central portion are a pair of arms one of which 84 is disposed in front of the guide and has a finger or a feeler 80 extending through an opening 85 in the vertical wall of the guide into the path of movement of the slides as they are fed from the magazine. The other arm 86 is positioned on the other side of the vertical wall of the guide and its lower end 87 extends forwardly through an opening 88 so as to lie adjacent the path of movement of the feeder flange 77. A spring 89 is secured beneath the upper web 13 and to the arm 86 so as to urge the wire element 81 to a position wherein the end 80 will be retained within the path of movement of the slides. As the foremost slide is removed from the magazine it engages the finger 80 to pivot the wire element 81 and dispose the end 87 in the path of return movement of the feeder flange 77. A more complete description of the stop means will appear hereinafter.

The feeder D, as previously mentioned, urges a column of slides in edge-to-edge relation along the guide A for successive disposition before the projection aperture 11. After projection the slides are moved to the right end of the guide where they are successively collected within the receiver C.

At the righthand end of the guide an arcuate spring 90 is secured at its right end to the guide wall 12 with its convex portion facing rearwardly. This spring is disposed below the upper web 13 at the cut-away portion 22 of the flange. An aperture 91 is provided in wall 12 to receive the lefthand end of the spring so that the lefthand end of the spring will project forwardly through the wall 12. The arcuate spring 90 provides a cam for shifting the upper edge of the transparencies rearwardly as they are moved into registry with the receiver C. As previously mentioned, the slides are pivoted about their lower edge to fall across the ledge 50. Thereafter, the slides tumble over the rear edge of the ledge 50 to spin or somersault about an axis between their upper and lower edges and fall into the receiver C. In Fig. 6 of the drawings, there is shown in dot and dash lines a slide falling into the receiver and the various positions taken by the slide are numbered 1 through 6. The rear face of the slide is shown in slightly heavier lines than is the forward face so as to clearly illustrate the tumbling or somersaulting of the slide through 270° from the position 1 where it leaves the guide and the position 6 where it is stacked within the receiver. By falling through 270° the slides are stacked in front face to rear face order in the same manner in which they were originally disposed within the supply magazine. Consequently, the operator can remove the stacked slides from the receiver and be assured that they are in proper arrangement for reinsertion within the supply magazine.

Fig. 10 illustrates a slight modification of the ejecting structure in that the previously described arcuate spring 90 is replaced by an arcuate boss 95 struck from the wall 12 of the guide adjacent its righthand end. The boss 95 functions in the same manner as the spring 90 in that it cams the upper edge of the slide rearwardly so that they will fall across the ledge 50 into the receiver. The operation of the boss 95 and the spring 90 are substantially identical in that they tilt the top edge of the slides rearwardly when they come into registry with the receiver to a position wherein gravity will cause the slides to fall across the ledge and tumble into the receiver as described.

Turning now to an explanation of the complete operation of the slide changer we shall commence with the supply magazine. The slides are arranged in front face to rear face order and disposed within the supply magazine so that the rear faces of the slides will be directed toward the wall 12 of the guide. Loading of the slides in the supply magazine is facilitated by the provision of an ear 96 deflected rearwardly from the follower flange 34 so as to engage a transverse pin 97 journaled in the walls 31 and 32 of the magazine. When the follower is shifted rearwardly to receive the supply of slides, the follower 33 will be retained in the withdrawn position by engagement of the ear 96 with the pin 97. Disengagement is easily effected by pushing the follower forwardly to urge the slides toward the guide. The pin 97 serves an additional purpose in that it retains the follower 33 in sliding engagement with the bottom 30 of the magazine. The foremost slides within the supply magazine are disposed within the upper and lower trackways 17 and 18 on the guide at the cut-away flange sections 19 and 20. There may be three or more slides disposed in the trackways depending upon the individual thickness of the slides.

The next operation is to depress the bulb 78 on the pneumatic pump so as to project the feeder D from the retracted position on the lefthand side of the magazine to the extended position to the righthand side of the magazine and slightly beyond the stop finger 80. In moving from the retracted to the extended position, the forward edge 63 of the feeder section 61 engages the lefthand edge of the foremost slide in the magazine to push the slide along the guide to the right toward the projection aperture 11. Thus, the foremost slide is moved edgewise from the magazine between the guide wall 12 and the front edge of the righthand wall of the magazine. The projection or cam 64 on the feeder engages the face of the second slide in the magazine to urge the remaining slides in the magazine rearwardly against the follower 33 so as to prevent snagging or jamming between the foremost slide and the second slide. The wiper 65 wipes across the face of the foremost slide as it is removed from the magazine to return a second slide to the magazine should it be moved concurrently with the foremost slide.

During movement from the magazine the foremost slide engages the finger 80 on the wire element 81 to pivot the wire arms 85 and 86 forwardly and thus dispose the lower end 87 of the arm 86 in the path of return movement of the flange 77 on the feeder. Thus, until the foremost slide has moved with the feeder D to the fully extended position of the feeder so as to clear the finger 80, the wire end 87 will block return movement of the feeder to the fully retracted position. Unless the feeder is allowed to return to the fully retracted position, it cannot engage the next foremost slide in the magazine. This operation of the wire stop element 81 prevents feeding of a second slide from the magazine until the foremost slide has been completely removed therefrom along the guide.

Reciprocation of the feeder D successively moves the slides from the magazine B and moves them along the guide A in a step-by-step operation. The movement of each slide along the guide is completed in four steps, first, out of the supply magazine, second, into projection registry, third, out of projection registry, and fourth, into registry with the receiver.

In the fourth step the slide is tilted rearwardly about its lower edge across the receiver ledge 50 and is tumbled into the receiver in the previously described manner. Since the feeder pushes a column of slides across the guide from the magazine one slide is collected in the receiver for each successive stroke of the feeder and the slides are collected within the receiver in the same order and arrangement as existed in the supply magazine.

From the foregoing description it will be understood that there is here provided a slide changing apparatus for successively feeding a plurality of slides from a supply magazine into a position for projection and thereafter the slides are successively collected in an order and arrangement which permits refeeding of the slides without rearrangement. The apparatus is characterized by its simplicity and compact arrangement and the operating elements are particularly adapted for convenient assembly and disassembly so that the elements may be easily and compactly stored and expeditiously mounted for operation in connection with a slide projector.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. Slide changing apparatus comprising an elongated guide having a channel for accommodating movement of a plurality of slides in edge-to-edge relation toward a projector, a supply magazine arranged to receive a plurality of slides in front face to rear face relation for delivery to said channel, a feeder mounted on the guide for transverse movement relative to said magazine to move the foremost slide therefrom toward the projector, means for reciprocating said feeder between a retracted position at one side of the magazine and an extended position beyond the other side of the magazine, and means for preventing feeding of a second slide until the foremost slide has been entirely removed from the magazine and comprising a stop member movably mounted on said guide and arranged to be shifted by the foremost slide during movement from the magazine from a normal position to a stop position in the path of movement of said feeder whereby said feeder cannot return to retracted position to move a second slide from the magazine until the foremost slide is completely removed therefrom.

2. Slide changing apparatus comprising an elongated guide having a channel for accommodating movement of the slides in edge-to-edge relation into and out of projection position, a supply magazine mounted on the guide to one side of the projection position and arranged to receive a plurality of slides in front face to rear face relation for delivery to said channel, a feeder slidably mounted on the guide for moving the foremost slide from the magazine toward the projector, means reciprocating said feeder between a retracted position at one side of the magazine and an extended position beyond the other side of the magazine, means for preventing feeding of a second slide until the foremost slide has been entirely removed from the magazine and comprising a stop member pivotally mounted on the guide and having a portion extending into the channel to the delivery side of the magazine and engageable with the foremost slide until said feeder has reached extended position, and another portion of said stop member being movable into the path of movement of said feeder upon engagement of said foremost slide and the first portion whereby said feeder cannot resume retracted position until the foremost slide is completely removed from the magazine.

3. A slide changing device comprising an elongated guide having upper and lower inturned flanges defining trackways for accommodating longitudinal movement therealong of a column of slides in edge-abutting relation toward a projector, a supply magazine arranged to receive a plurality of slides in front face to rear face relation for delivery to the trackways of said guide, a feeder slidably mounted on the guide for moving the foremost slide in said trackways from said magazine towards the projector, means reciprocating said feeder between a retracted position at one side of the magazine and an extended position beyond the other side of the magazine, and means for preventing feeding of a second slide until the foremost slide has been entirely removed from the magazine and comprising a stop member pivotally supported on the guide and having one end portion extending into the lower trackway to the delivery side of said magazine so as to be engaged by the foremost slide upon movement from the magazine, the other end portion of said stop member being disposed adjacent the path of movement of said feeder and movable into the path of movement upon engagement of said foremost slide and said one end portion, whereby said feeder cannot return to retracted position until the foremost slide has been completely removed from the magazine.

4. A slide changing device comprising an elongated guide having a channel for accommodating movement of the slides in edge-to-edge relation towards a projector, a supply magazine arranged to receive a plurality of slides in front face to rear face relation for delivery to the channel of said guide, a feeder slidably mounted on the guide for movement between a retracted position on one side of the magazine and an extended position on the other side of the magazine, said feeder being arranged to engage the foremost slide in said magazine and move it edgewise therefrom along the channel of the guide, a projection on said feeder engageable with the face of the second slide in said magazine to move it rearwardly in the magazine as said first slide is removed therefrom, means reciprocating said feeder between said retracted position and said extended position, and means for preventing feeding of a second slide until the foremost slide has been entirely removed from the magazine comprising a stop member pivotally mounted on said guide and arranged to be shifted by the foremost slide during movement from the magazine from a normal position to a stop position in the path of movement of said feeder whereby said feeder cannot return to retracted position until said foremost slide is completely removed from the magazine.

5. A slide changing device comprising a horizontally disposed elongated guide having a generally vertical wall and upper and lower generally horizontal webs, each of said webs having an inturned flange defining upper and lower trackways for accommodating longitudinal movement along the guide of a column of slides toward a projector, said upper and lower flanges having vertically aligned notches and the lower web being depressed adjacent the notch in the lower flange to provide a seat, said vertical wall having an aperture adjacent said seat, a trough-like supply magazine having a bottom wall and a pair of side walls, said bottom wall having a forwardly extending lug engageable within said aperture so as to seat said bottom wall on the lower web within the lower notch, and each of said side walls having an outturned ear engageable behind the upper flange adjacent the upper notch so as to connect said magazine to said guide with its forward end adjacent the vertical wall of said guide.

FRANCIS CHEYNEY BEEKLEY.

REFERENCES CITED

The following references are of record in the file of this patent:

UNITED STATES PATENTS

| Number | Name | Date |
|---|---|---|
| 590,903 | Newman | Sept. 28, 1897 |
| 1,298,417 | Stillwaggon | Mar. 25, 1919 |
| 2,260,660 | Darwin | Oct. 28, 1941 |
| 2,310,047 | Waldeyer | Feb. 2, 1943 |
| 2,476,797 | Bennett et al. | July 19, 1949 |
| 2,513,102 | Parlini et al. | June 27, 1950 |
| 2,549,898 | Fish | Apr. 24, 1951 |

FOREIGN PATENTS

| Number | Country | Date |
|---|---|---|
| 11,324 | Great Britain | of 1910 |